US006421352B1

(12) United States Patent
Manaka et al.

(10) Patent No.: US 6,421,352 B1
(45) Date of Patent: Jul. 16, 2002

(54) DATA PROCESSING APPARATUS CAPABLE OF INDEPENDENTLY INTERRUPTING TRANSMISSION DATA

(75) Inventors: Susumu Manaka; Mitsuji Okada, both of Tokyo (JP)

(73) Assignee: NEC Corporation

( * ) Notice: Subject to any disclaimer, the term of this patent is extended or adjusted under 35 U.S.C. 154(b) by 0 days.

(21) Appl. No.: 09/092,341

(22) Filed: Jun. 5, 1998

(30) Foreign Application Priority Data

Jun. 5, 1997 (JP) .............................. 9-148125

(51) Int. Cl.[7] ........................................... H04L 12/413
(52) U.S. Cl. ....................................... 370/445; 370/461
(58) Field of Search ...................... 370/229, 230–236, 370/252, 401, 445, 447, 448, 450, 454, 456, 459, 461, 462, 362, 421, 423, 434

(56) References Cited

U.S. PATENT DOCUMENTS

| 5,327,534 | A | * | 7/1994 | Hutchison et al. ........... 709/235 |
| 6,018,526 | A | * | 1/2000 | Liu et al. ..................... 370/401 |
| 6,026,075 | A | * | 2/2000 | Linville et al. .............. 370/230 |
| 6,031,821 | A | * | 2/2000 | Kalkunte et al. ............ 370/235 |
| 6,167,029 | A | * | 12/2000 | Ramakrishnan ............. 370/235 |
| 6,222,825 | B1 | * | 4/2001 | Mangin et al. .............. 370/235 |

FOREIGN PATENT DOCUMENTS

| JP | 6-216903 | 8/1994 |
| JP | 10-13441 | 1/1998 |
| JP | 10-285179 | 10/1998 |
| JP | 10-336240 | 12/1998 |
| JP | 11-506287 | 6/1999 |
| JP | 11-506288 | 6/1999 |
| WO | 96/41456 | 12/1996 |

OTHER PUBLICATIONS

IEEE P802.3X, "Specification for 802.3 Full Duplex Operation", pp. 100–116, Jun. 4, 1996.
IEEE P802.3X, "Specification for 802.3 Full–Duplex Operation", pp. 102–120, Feb. 9, 1997.
Japanese Office Action issued Jun. 27, 2000 in a related application with English translation of relevant portions.
1997 IEEE International Conference on Communications, Jun. 8–12, 1997, Conference Record, vol. 1, J. Ren et al., "Flow Control and Congestion Avoidance in Switching Ethernet LANs," pp. 508–512. (Quantitative evaluation of the flow control in full–duplex ethernet.).
1997, Annual Review of Communications, B. MacLeod, "Gigabit Ethernet Full–Duplex Repeaters," pp. 501–509. (On thetechnique of flow control in full–duplex ethernet.).
IEEE Std 802.3 1998 Edition, Part 3: Carier Sense Multiple Access With Collision Detection (CSMA/CD) Access Method and Physical Layer Specifications, Annex 31B, "MAC Control PAUSE Operation," pp. 1206–1215. (PAUSE Control: as described in this application: the part of the standards corresponding to the conventional example.).

* cited by examiner

Primary Examiner—Chau Nguyen
Assistant Examiner—Chiho A. Lee
(74) Attorney, Agent, or Firm—Dickstein, Shapiro, Morin & Oshinsky, LLP.

(57) ABSTRACT

In a data processing apparatus, a receiver receives pause control data signals from other data processing apparatuses. Each of the pause control data signals includes identification data of one of the other data processing apparatuses and a transmission interrupting time period. The identification data associated with the transmission interrupting time period is stored in a memory. Also, when a time corresponding to the transmission interrupting time period has passed, the identification data is removed from the memory. Transmission of data to one of the other data processing apparatuses having the identification data stored in the memory is interrupted.

24 Claims, 7 Drawing Sheets

DATA PROCESSING APPARATUS CAPABLE OF INDEPENDENTLY INTERRUPTING TRANSMISSION DATA

BACKGROUND OF THE INVENTION

1. Field of the Invention

The present invention relates to a data processing apparatus such as a local area network (LAN) connection apparatus used in a full duplex Ethernet LAN system.

2. Description of the Related Art

In a full duplex Ethernet LAN system where a plurality of LAN connection apparatuses (units) are connected by LANs, congestion preventing means is provided in each of the LAN connection units (see: IEEE P802.3X, "Specification for 802.3 Full Duplex Operation", pp. 100–116, Jun. 4, 1996). That is, when congestion occurs in one LAN connection unit, this LAN connection unit generates a pause packet and transmits it to the other LAN connection units. Then, the other LAN connection units interrupt the transmission of data for a pause time period indicated by the pause packet. As a result, the congestion of the above-mentioned LAN connection unit can be dissolved. This will be explained later in detail.

In the above-described prior art LAN system, however, when one LAN connection unit transmits a pause packet simultaneously to a plurality of other LAN connection units, the transmission of packets is interrupted in the plurality of LAN connection units. In this case, the transmission of packets having destinations to the LAN connection units where congestion does not occur may be interrupted, which retards the entire communication of the LAN system.

SUMMARY OF THE INVENTION

It is an object of the present invention to dissolve the congestion state of a data processing apparatus without retarding the entire communication of a data processing system.

According to the present invention, in a data processing apparatus, a receiver receives pause control data signals from other data processing apparatuses. Each of the pause control data signals includes identification data of one of the other data processing apparatuses and a transmission interrupting time period. The identification data associated with the transmission interrupting time period is stored in a memory. Also, when a time corresponding to the transmission interrupting time period has passed, the identification data is removed from the memory. Transmission of data to one of the other data processing apparatuses having the identification data stored in the memory is interrupted.

Thus, the transmission of data only for the data processing apparatus where congestion occurs is interrupted.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, a prior art data processing system will be explained with reference to FIGS. 1, 2 and 3.

Figure 1:
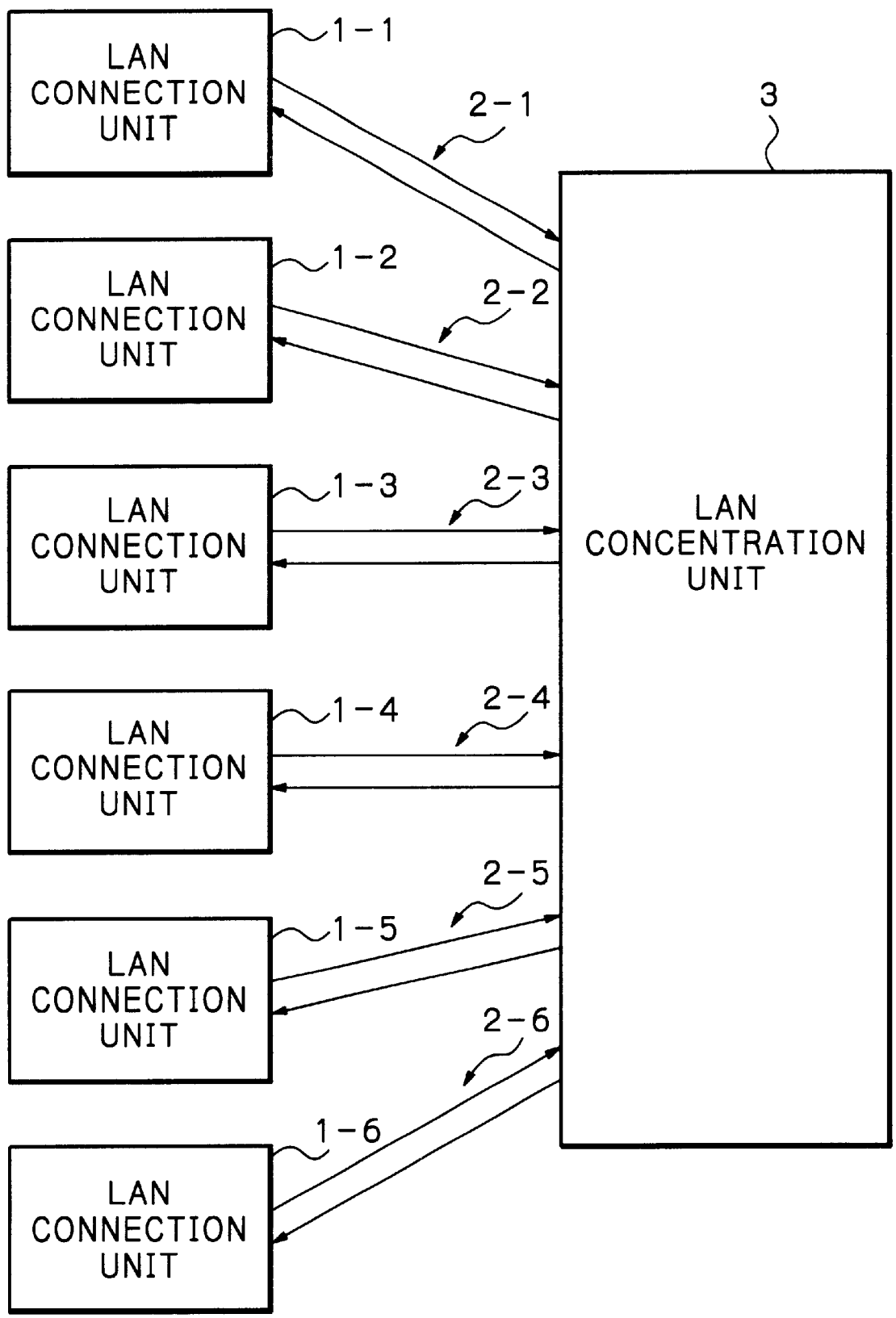
FIG. 1 is a block circuit diagram illustrating a prior art data processing system.

In FIG. 1, which illustrates a prior art LAN system as a data processing system, a plurality of LAN connection units 1-1, 1-2, . . . as data processing units are connected by LANs 2-1, 2-2, . . . as communication networks to a LAN concentration unit.

Figure 2:
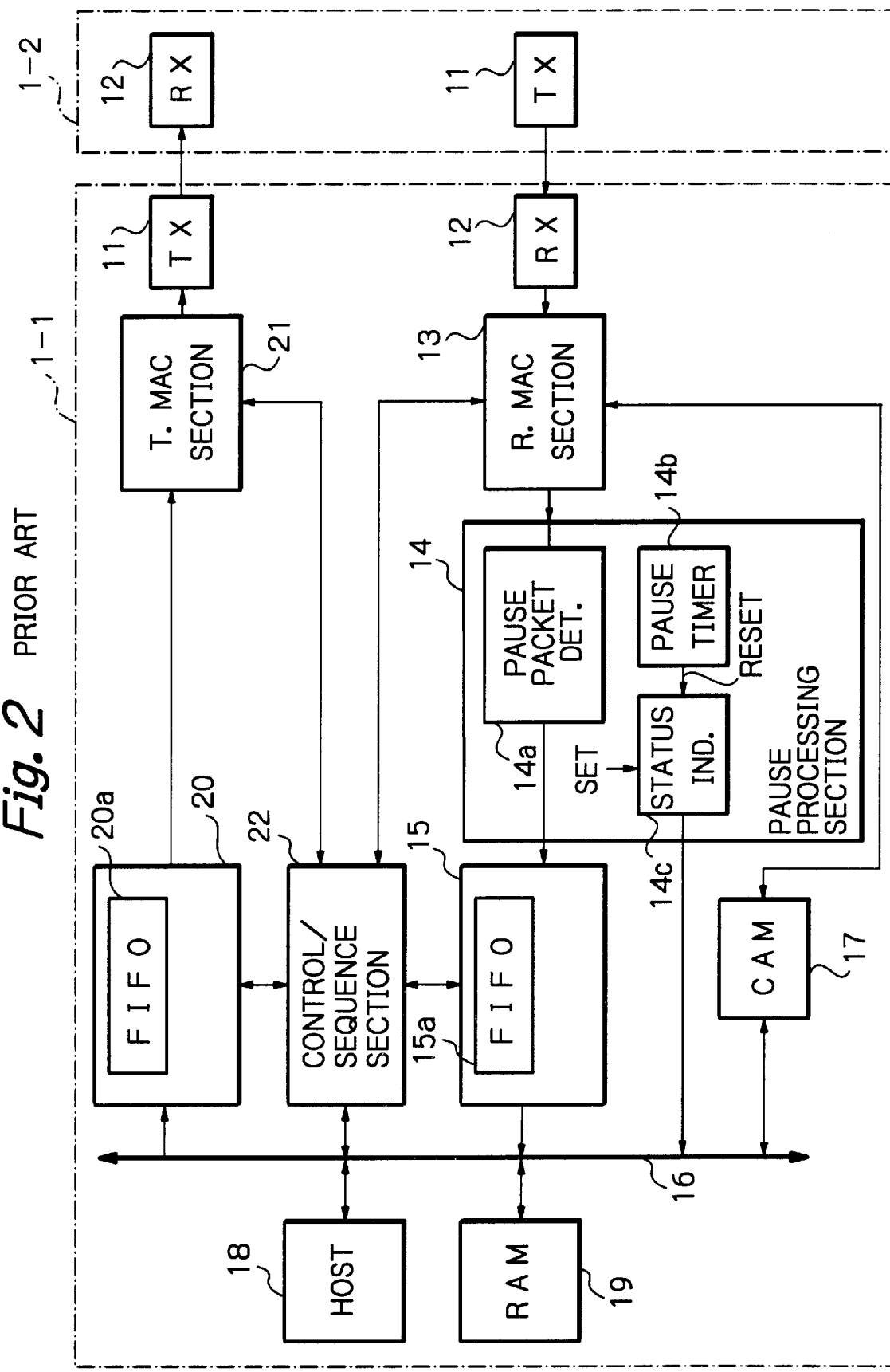
FIG. 2 is a detailed block circuit diagram of the data processing unit of FIG. 1.

In FIG. 2, which is a detailed block circuit diagram of the LAN connection unit 1-1 of FIG. 1, reference numeral 11 designates a transmitter for transmitting various packets to the other LAN connection units, and 12 designates a receiver for receiving various packets from the other LAN connection units.

The receiver 12 is connected to a transmission interruption requesting circuit (not shown). That is, when congestion occurs in the receiver 12, the transmission interruption requesting circuit generates a pause control packet including a pause timer value. The pause control packet is transmitted by the transmitter 11 to all the other LAN connection units.

The receiver 12 is connected via a receiving medium access control (MAC) section 13, a pause processing section 14 and a receiving buffer supervising section 15 including a first-in first-out (FIFO) 15a to a system bus 16. The pause processing section 14 has a pause packet detector 14a, a pause timer 14b and a status indicator 14c.

Also, a content addressable memory (CAM) 17 for storing multicast addresses is connected between the system bus 16 and the receiving MAC section 13.

Further, a host processor 18 and a random access memory (RAM) 19 are connected to the system bus 16. The RAM 19 temporarily stores transmitting packets. The host processor 18 transmits the packets stored in the RAM 19 to a transmitting buffer supervising section 20 including a FIFO 20a in accordance with the value of the status indicator 14c of the pause processing section 14. Then, the transmitting buffer supervising section 20 transmits the packets via a transmitting MAC section 21 to the transmitter 11.

In addition, a control/sequence section 22 is connected to the receiving MAC section 13, the receiving buffer supervising section 15, the system bus 16, the transmitting buffer supervising section 20 and the transmitting MAC section 21.

Figure 3:
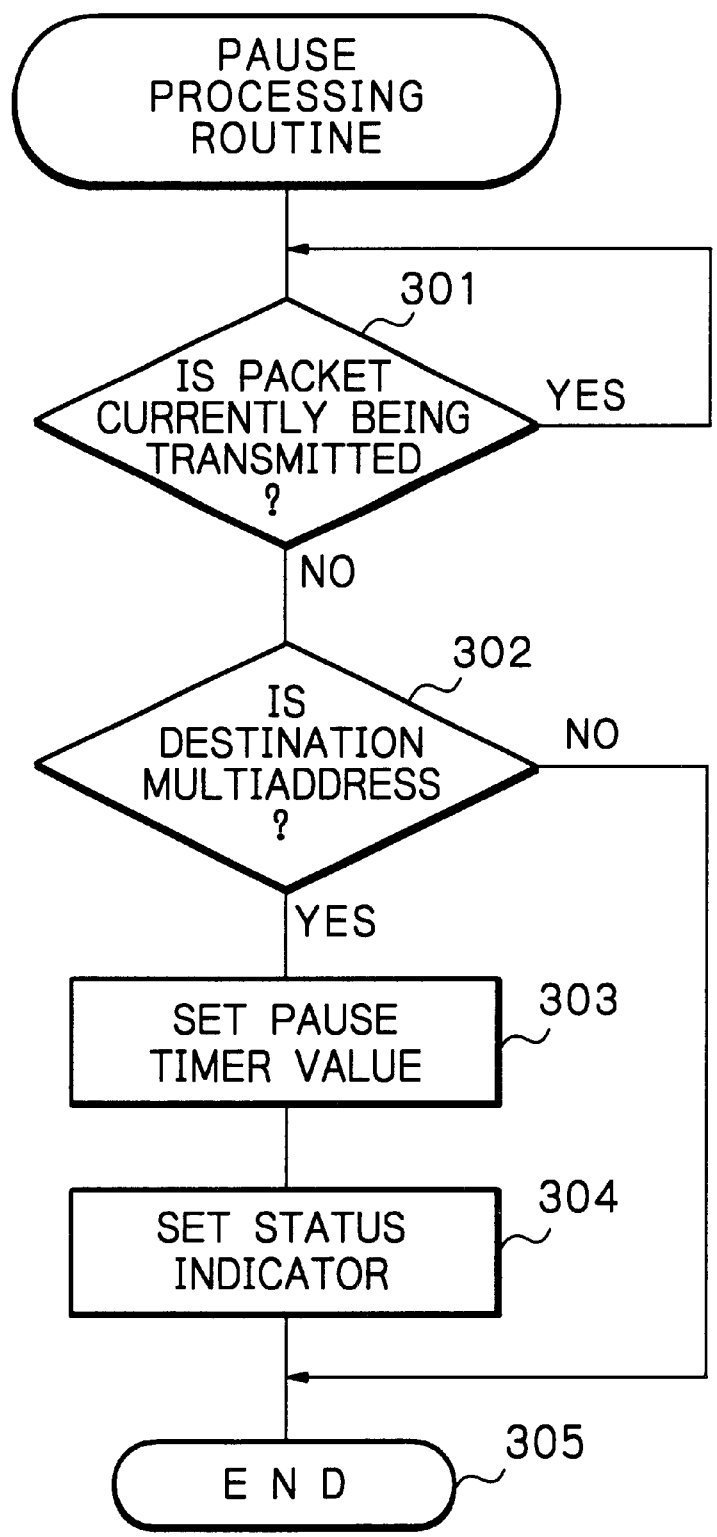
FIG. 3 is a flowchart for explaining the operation of the pause processing section of FIG. 2.

The operation of the pause processing section 14 of FIG. 2 will be explained next with reference to a flowchart as shown in FIG. 3. The pause processing routine of FIG. 3 is started when the pause packet detector 14a detects a pause packet.

First, at step 301, it is determined whether or not a packet is currently being transmitted from the LAN connection unit 1-1. Note that the pause processing section 14 can carry out the determination at step 301 by sending a query via the receiving MAC section 13 to the control/sequence section 22. As a result, if a packet is not currently being transmitted, the control proceeds to step 302. Otherwise, the control waits for the transmission of the packet to complete.

Next, at step 302, it is determined whether or not a destination address set in the detected pause packet is one of the multiaddresses stored in the CAM 17. Note that the pause processing section 14 can recognize the multiaddress stored in the CAM 17 via the receiving MAC section 13. Only if the destination address is one of the multiaddresses stored in the CAM 17, i.e., the CAM 17 is hit by the destination address, does the control proceed to step 303. Otherwise, the control proceeds directly to step 305.

At step 303, the pause processing section 14 sets a pause timer value included in the detected pause packet in the pause timer 14b which is in this case a down counter. Then, the pause timer 14b is operated.

At step 304, the pause processing section 14 sets the status indicator 14c. That is, the output of the status indicator 14c is caused to be "1".

Then, the routine of FIG. 3 is completed by step 305.

When a time corresponding to the pause timer value has passed, the pause timer 14b generates a carry signal and transmits it to the status indicator 14c. As a result, the status indicator 14c is reset, i.e., the output of the status indicator 14c is caused to be "0".

Thus, the output of the status indicator 14c is maintained at "1" for the pause time set in the pause packet.

The host processor 18 monitors the status indicator 14c. As a result, when the output of the status indicator 14c is "1", the host processor 18 interrupts the transmission of packets from the RAM 19 to the transmitting buffer supervising section 20. Therefore, the transmission of packets is temporarily interrupted, congestion in a LAN connection unit such as 1-2 can be dissolved. Then, after the output of the status indicator 14c is "0", the host processor restarts the transmission of packets from the RAM 19 to the transmitting buffer supervising section 20a.

Note that, if the output of the status indicator 14c is "1", the host processor 18 can directly stop the operation of the transmitting buffer supervising section 20.

In the LAN system of FIGS. 1, 2 and 3, however, when one LAN connection unit such as 1-2 transmits a pause packet simultaneously to a plurality of other LAN connection units, the transmission of packets is interrupted in the plurality of LAN connection units. In this case, the transmission of packets having destinations to even the LAN connection units where congestion does not occur may be interrupted, which retards the entire communication of the LAN system.

Figure 4:
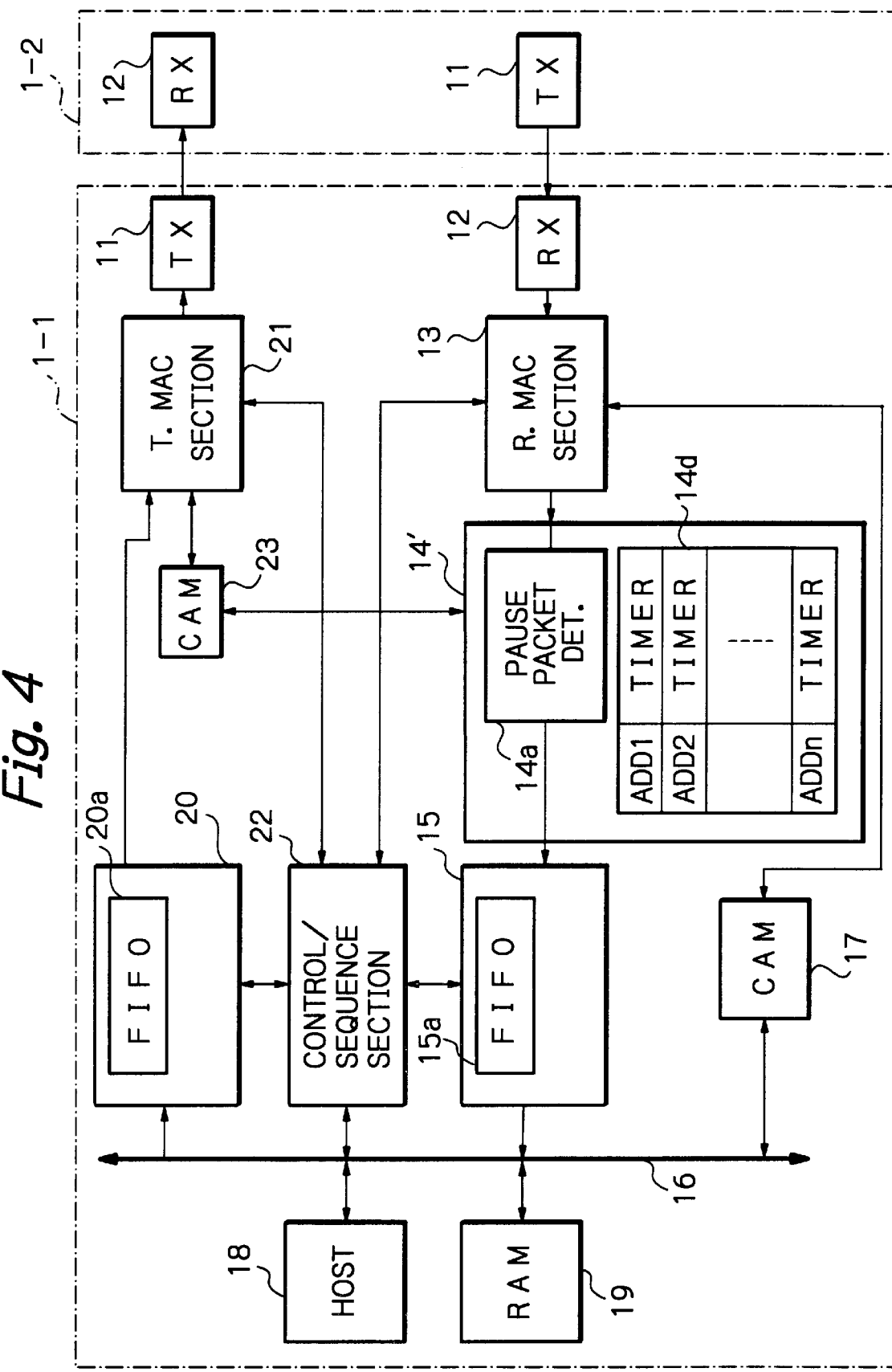
FIG. 4 is a block circuit diagram of the data processing apparatus according to the present invention.

In FIG. 4, which illustrates an embodiment of the present invention, the pause processing section 14 of FIG. 2 is replaced by a pause processing section 14'. The pause processing section 14' includes a timer memory 14d instead of the pause timer 14b and the status indicator 14c of FIG. 2. The timer memory 14d has registered communication addresses ADD1, ADD2, . . . , ADDn of the other LAN connection units connected to the LAN concentration unit 3 associated with pause timer value storing areas. Also, a pause control CAM 23 is connected between the pause processing section 14' and the transmitting MAC section 21.

Figure 5:
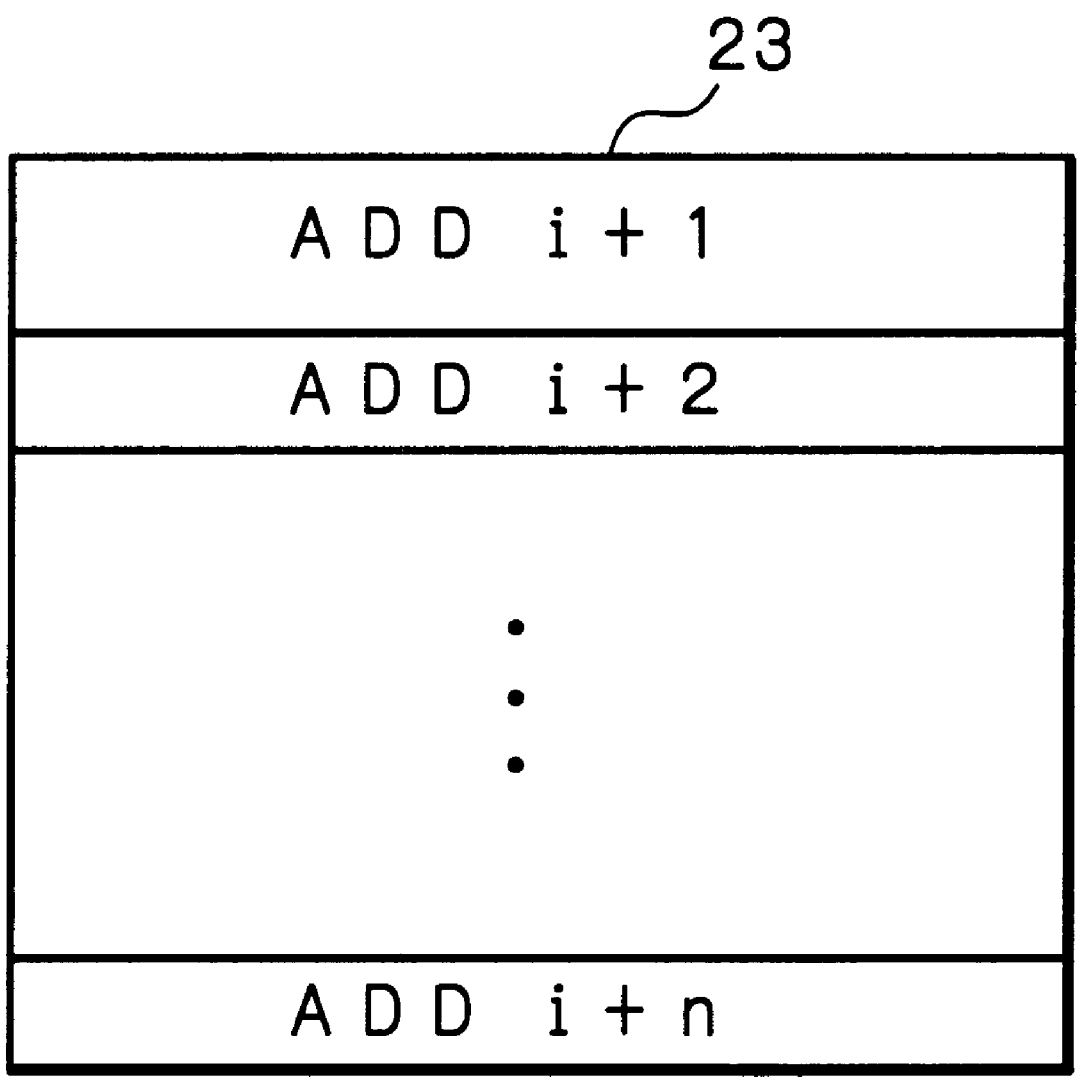
FIG. 5 is a structure diagram of the pause control CAM of FIG. 4.

As shown in FIG. 5, the pause control CAM 23 has pause requesting origination address storing areas. In this case, the number of the pause requesting origination address storing areas is the number of the other LAN connection units connected to the LAN concentration unit 3, i.e., the number of the registered communication addresses ADD1, ADD2, . . . , ADDn of the timer memory 14d.

Figure 6:
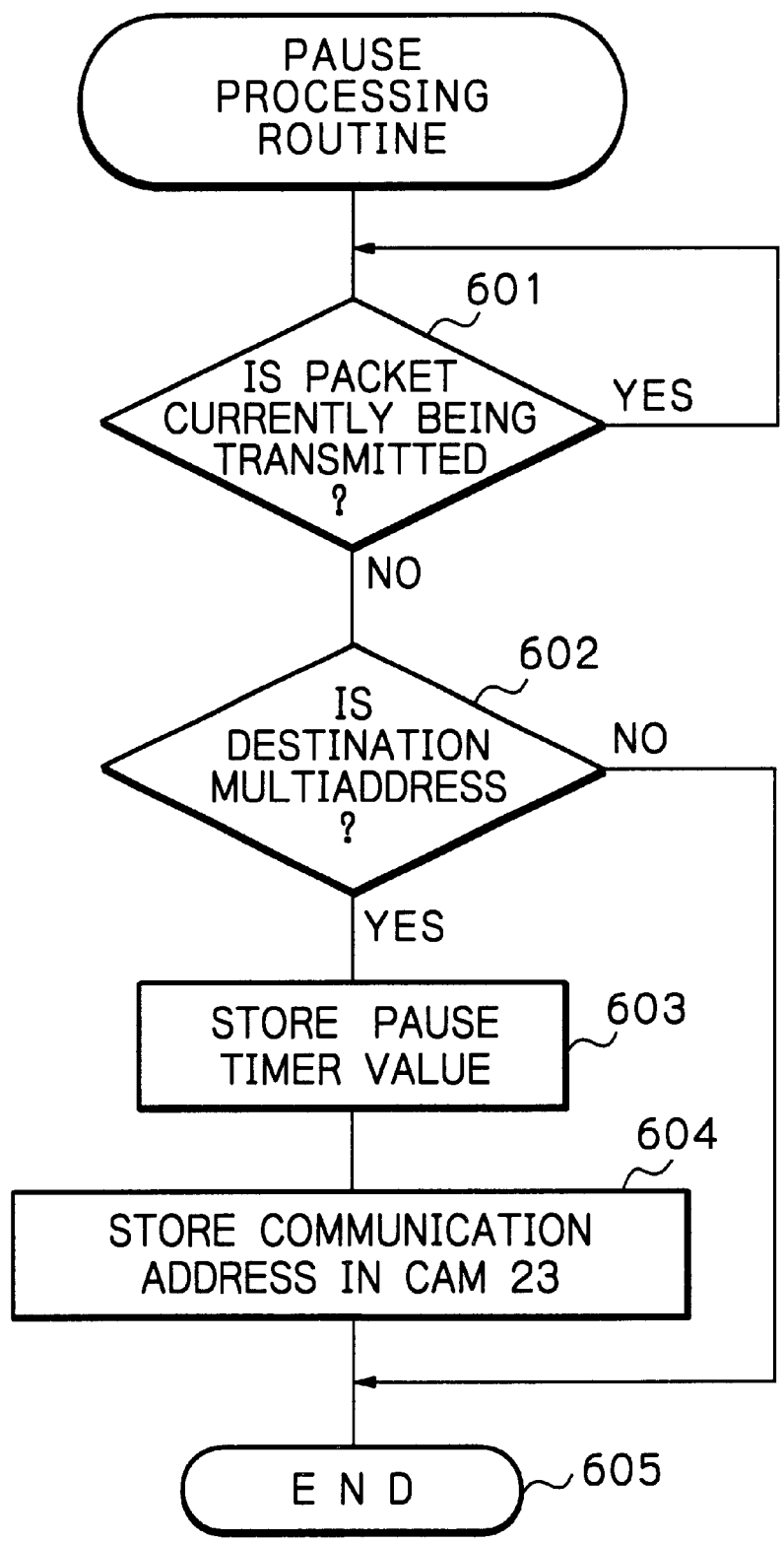
FIGS. 6 and 7 are flowcharts for explaining the operation of the pause processing section of FIG. 4.

The operation of the pause processing section 14' of FIG. 4 will be explained next with reference to a flowchart as shown in FIG. 6. The pause processing routine of FIG. 6 is started when the pause packet detector 14a detects a pause packet.

First, at step 601, it is determined whether or not a packet is currently being transmitted from the LAN connection unit 1-1. Note that the pause processing section 14' can carry out the determination at step 601 by sending a query via the receiving MAC section 13 to the control/sequence section 22. As a result, if a packet is not currently being transmitted, the control proceeds to step 602. Otherwise, the control waits for the transmission of the packet to complete.

Next, at step 602, it is determined whether or not a destination address set in the detected pause packet is one of the multiaddresses stored in the CAM 17. Note that the pause processing section 14' can recognize the multiaddress stored in the CAM 17 via the receiving MAC section 13. Only if the destination address is one of the multiaddresses stored in the CAM 17, i.e., the CAM 17 is hit by the destination address, does the control proceed to step 603. Otherwise, the control proceeds directly to step 605.

At step 603, the pause processing section 14' stores a pause timer value included in the detected pause packet in the pause timer memory 14d. In this case, the pause timer value is stored in one of the pause timer value storing areas indicated by the communication address included in the detected pause packet.

Note that all the contents of the pause timer value storing areas are decremented by 1 for every predetermined time period. Therefore, when the content of one of the pause timer value storing areas becomes negative, the pause timer memory 14d generates a carry signal.

Next, at step 604, the pause processing section 14' stores the communication address included in the detected pause packet in the pause control CAM 23.

Then, the routine of FIG. 6 is completed by step 605.

Figure 7:
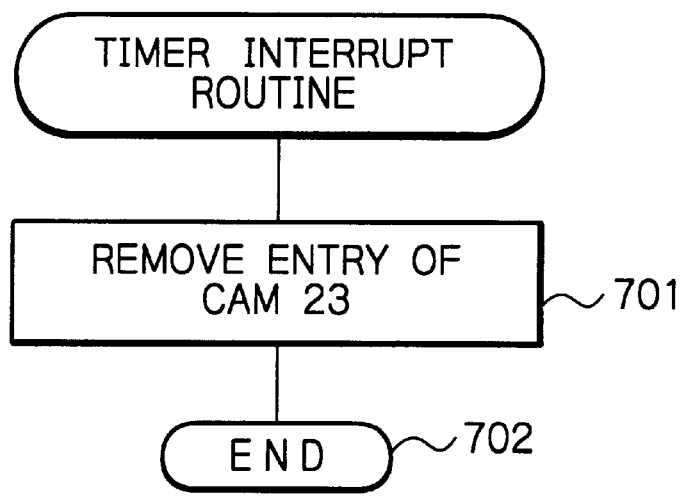

When the pause timer memory 14d generates a carry signal, the pause processing section 14' carries out an interrupt operation as shown in FIG. 7. That is, at step 701, the pause processing section 14' removes the communication address corresponding to the pause timer value storing area that has issued the carry signal. Then, the routine of FIG. 7 is completed by step 702.

Figure 8:
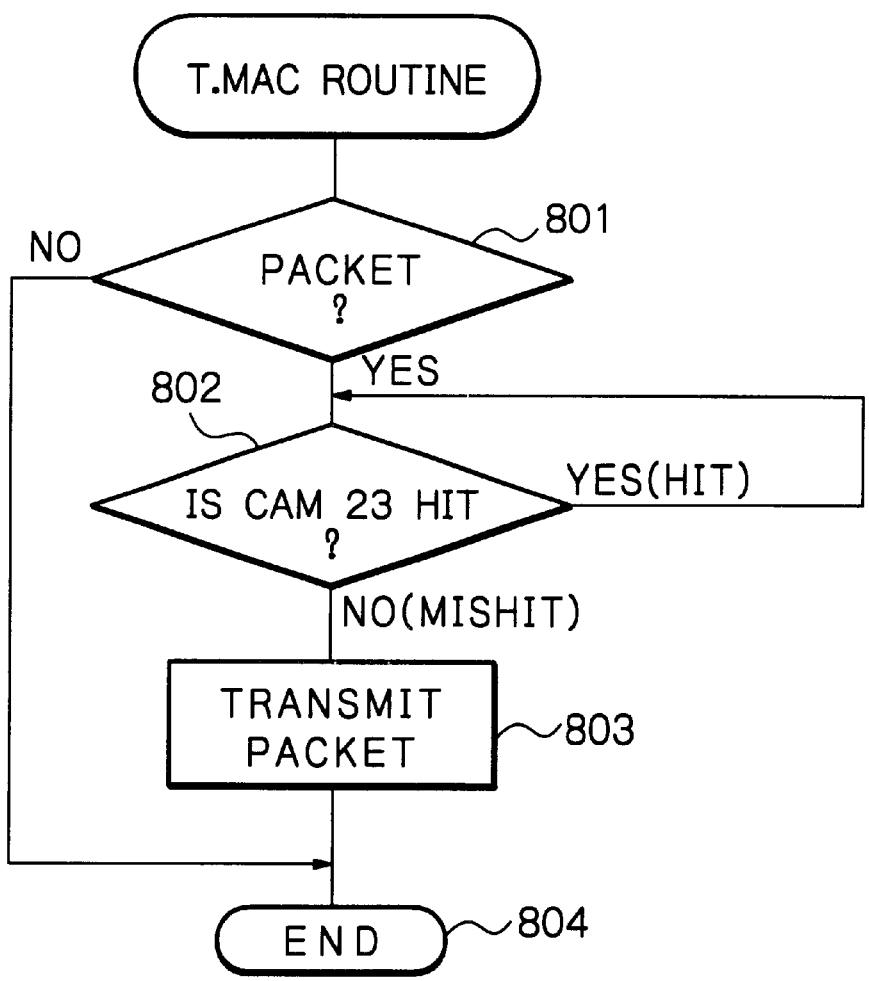
FIG. 8 is a flowchart for explaining the operation of the transmitting MAC section of FIG. 4.

The operation of the transmitting MAC section 21 of FIG. 4 will be explained next with reference to a flowchart as shown in FIG. 8.

First, at step 801, it is determined whether there is a packet to be transmitted from the LAN connection unit 1-1. Only if there is such a packet, does the control proceed to step 802. Otherwise, the control proceeds directly to step 802.

At step 802, it is determined whether or not a destination communication address included in the packet to be transmitted exists in the pause control CAM 23, i.e., whether the pause control CAM 23 is hit or mishit by the destination communication address. As a result, only if the pause control CAM 23 is mishit, does the control proceed to step 803 which transmits the packet to the transmitter 11. Otherwise, the control waits for the pause control CAM 23 to be mishit by the destination communication address.

Then, the routine of FIG. 8 is completed by step 804.

Thus, the transmission of packets having destinations to only LAN connection units where congestion occurs is temporarily interrupted. In other words, when one of the LAN connection units issues a pause control packet, transmission of packets to the one of the LAN connection units is interrupted, while transmission of packets to the other LAN connection units is not interrupted. This enhances the communication of the entire LAN system.

As explained hereinabove, according to the present invention, since transmission of packets only for LAN connection units where congestion occurs is interrupted, the communication of an entire data processing (LAN) system can be enhanced.

What is claimed is:

1. A data processing apparatus comprising:

means for receiving pause control data signals from other data processing apparatuses, each of said pause control data signals including identification data of one of said other data processing apparatuses and a transmission interrupting time period;

means for storing said identification data associated with said transmission interrupting time period;

means for removing stored identification data when a time corresponding to said transmission interrupting time period therefor has passed; and means for interrupting transmission of data to one of said other data processing apparatuses having said identification data.

2. The apparatus as set forth in claim 1, wherein said identification data is a communication address of the one of said other data processing apparatuses.

3. The apparatus as set forth in claim 1, wherein said storing means comprises a content addressable memory for storing said identification data, said transmission interrupting means comprising:

means for determining whether identification data of said data hits or mishits said content addressable memory;

means for interrupting transmission of data when the identification data hits said content addressable memory.

4. A data processing apparatus capable of being connected to other data processing apparatuses, comprising:

a receiver for receiving first data signals from said other data processing apparatuses;

a pause control data detector, operatively connected to said receiver, for detecting a pause control data signal from said first data signals, said pause control data signal including first identification data of one of said other data processing apparatuses and a transmission interrupting time period;

a first storing means for storing said transmission interrupting time period;

a timer means for determining whether or not said transmission interrupting time period has passed;

a second storing means for storing said first identification data;

means for removing said first identification data from said second storing means when said transmission interrupting time period has passed;

a transmitter for transmitting second data signals;

a transmission control circuit, connected to said transmitter, for determining whether or not second identification data of each of said second data signals coincides with said first identification data, so as to interrupt transmission of said second data signals when said second identification data coincides with said first identification data.

5. The apparatus as set forth in claim 4, wherein each of said first and second identification data is a communication address of the one of said other data processing apparatuses.

6. The apparatus as set forth in claim 4, wherein said second storing means comprises a content addressable memory for storing said first identification data, said transmission control circuit comprising:

means for determining whether said second identification data hits or mishits said content addressable memory; and means for interrupting transmission of said second data signals when said second identification data hits said content addressable memory.

7. The apparatus as set forth in claim 4, further comprising means for determining whether or not one of said second data signals is currently being transmitted, said first and second storing means storing said transmission interrupting time period and said first identification data, respectively, after transmission of the one of said second data signals is completed.

8. The apparatus as set forth in claim 4, further comprising:

a third storing means for storing third identification data showing a multicast address; and means for determining whether or not said first identification data coincides with said third identification data, said first and second storing means storing said transmission interrupting time period and said first identification data only when said first identification data coincides with said third identification data.

9. A LAN connection apparatus capable of being connected to other LAN connection apparatuses, comprising:

a receiver for receiving first packets from said other LAN connection apparatuses;

a pause packet detector, operatively connected to said receiver, for detecting a pause packet from said first packets, said pause packet including first identification data of one of said other LAN connection apparatuses and a transmission interrupting time period;

a first storing means for storing said transmission interrupting time period;

a timer means for determining whether or not said transmission interrupting time period has passed;

a second storing means for storing said first identification data;

means for removing said first identification data from said second storing means when said transmission interrupting time period has passed;

a transmitter for transmitting second packets;

a transmission control circuit, connected to said transmitter, for determining whether or not second identification data of each of said second packets coincides with said first identification data, so as to interrupt transmission of said second packets when said second identification data coincides with said first identification data.

10. The apparatus as set forth in claim 9, wherein each of said first and second identification data is a communication address of the one of said other LAN connection apparatuses.

11. The apparatus as set forth in claim 9, wherein said second storing means comprises a content addressable memory for storing said first identification data, said transmission control circuit comprising:

means for determining whether said second identification data hits or mishits said content addressable memory; and means for interrupting transmission of said second packets when said second identification data hits said content addressable memory.

12. The apparatus as set forth in claim 9, further comprising means for determining whether or not one of said second packets is currently being transmitted,
   said first and second storing means storing said transmission interrupting time period and said first identification data, respectively, after transmission of the one of said second packets is completed.

13. The apparatus as set forth in claim 9, further comprising:
   a third storing means for storing third identification data showing a multicast address; and
   means for determining whether or not said first second identification data coincides with said third identification data,
   said first and second storing means storing said transmission interrupting time period and said first identification data only when said first identification data coincides with said third identification data.

14. A data processing apparatus comprising:
   a sub-system operative to receive pause control data signals from other data processing apparatuses,
      each of said pause control data signals including identification data of one of said other data processing apparatuses and an associated transmission interrupting time period value;
   a memory operative to store identification data associated with a transmission interrupting time period value;
   a first controller operative to remove stored identification data when a time corresponding to said transmission interrupting time period therefor has passed; and
   a second controller operative to interrupt transmission of data to a data processing apparatus having said identification data.

15. A data processing apparatus capable of being connected to other data processing apparatuses, comprising:
   a receiver operative to receive first data signals from said other data processing apparatuses;
   a pause control data detector, operatively connected to said receiver, for detecting a received pause control data signal, said pause control data signal including first data identifying one of said other data processing apparatuses and an associated transmission interruption time period value;
   a first memory operative to store said transmission interruption time period value;
   a timer operative to determine whether or not said transmission interruption time period has passed;
   a second memory operative to store said first identifying data;
   a memory controller operative to remove said first identifying data from said second memory when said transmission interruption time period has passed;
   a transmitter for transmitting second data signals;
   a transmission control circuit, connected to said transmitter, said transmission control circuit being operative:
      to determine whether or not destination identifying data included in each of said second data signals coincides with stored first identifying data, and
      to interrupt transmission of said second data signals when coincidence is determined.

16. The apparatus as set forth in claim 15, wherein said first identifying data and destination identifying are each the communication address of one of said other data processing apparatuses.

17. The apparatus as set forth in claim 15, wherein:
   said second memory comprises a content addressable operative store said first identification data; and
   said transmission control circuit comprises:
      a circuit operative to determine whether said destination identifying data hits or mishits said content addressable memory; and
      a further circuit operative to interrupt transmission of said second data signals when said second identification data hits said content addressable memory.

18. The apparatus as set forth in claim 15, further comprising:
   a circuit operative to generate a control signal when one of said second data signals is being transmitted, and wherein:
   said first and second memories are operative in response to said control signal to store said transmission interrupting time period and said first identifying data, respectively, after transmission of the one of said second data signals is completed.

19. The apparatus as set forth in claim 15, further comprising:
   a third memory operative to store third identifying data showing a multicast address; and
   a circuit operative to generate a control signal when said first identifying data coincides with said third identifying data, and wherein:
   said first and second memories are operative to store said transmission interrupting time period and said first identifying data only in response to said control signal.

20. A LAN connection apparatus capable of being connected to other LAN connection apparatuses, comprising:
   a receiver for receiving first packets from said other LAN connection apparatuses;
   a pause packet detector, operatively connected to said receiver to detect a received pause packet,
      said pause packet including first data identifying one of said other LAN connection apparatuses and a transmission interruption time period value;
   a first memory operative to store said transmission interruption time period value;
   a timer operative to determine whether or not said transmission interruption time period has passed;
   a second memory operative to store said first identifying data;
   a memory controller operative to remove said first identifying data from said second memory when said transmission interruption time period has passed;
   a transmitter operative to transmit second packets;
   a transmission control circuit responsive to second identifying data in said second packets:
      to determine whether or not a destination for each of said second packets coincides with said stored first identifying data; and
      to interrupt transmission of said second packets when coincidence is determined.

21. The apparatus as set forth in claim 20, wherein said first and second identifying data are communication addresses of others of said LAN connection apparatuses.

22. The apparatus as set forth in claim 20, wherein said second memory comprises a content addressable memory for storing said first identification data, and wherein:
   said transmission control circuit comprises:
      a circuit operative to determine whether said second identifying data hits or mishits said content addressable memory; and a further circuit operative to interrupt transmission of said second packets when said second identification data hits said content addressable memory.

23. The apparatus as set forth in claim 20, further comprising:

a circuit operative to generate a control signal one of said second packets is being transmitted, and wherein:

said first and second memories are operative in response to said control signal to store said transmission interrupting time period and said first identifying data, respectively, after transmission of the one of said second data signals is completed.

24. The apparatus as set forth in claim 20, further comprising:

a third memory operative to store third identification data showing a multicast address; and a circuit operative to generate a control signal when said first identifying data coincides with said third identifying data, and wherein:

said first and second memories are operative to store said transmission interrupting time period and said first identifying data only in response to said control signal.

* * * * *